US012748011B2

(12) United States Patent
Li et al.

(10) Patent No.: US 12,748,011 B2
(45) Date of Patent: Sep. 29, 2026

(54) PIPELINE LEAKAGE MONITORING METHOD AND SYSTEM BASED ON OPTICAL FIBER SENSING

(71) Applicant: ANHUI ZHIBO PHOTOELECTRIC TECHNOLOGY CO., LTD., Hefei (CN)

(72) Inventors: Pengfei Li, Hefei (CN); Heng Luo, Hefei (CN); Jiatong Luo, Hefei (CN); Rui Wang, Hefei (CN); Yusheng Wang, Hefei (CN)

(73) Assignee: Anhui Zhibo Photoelectric Technology Co., Ltd., Hefei (CN)

( * ) Notice: Subject to any disclaimer, the term of this patent is extended or adjusted under 35 U.S.C. 154(b) by 0 days.

(21) Appl. No.: 19/006,837

(22) Filed: Dec. 31, 2024

(65) Prior Publication Data

US 2026/0079070 A1 Mar. 19, 2026

(30) Foreign Application Priority Data

Sep. 13, 2024 (CN) ........................ 202411283416.9

(51) Int. Cl.
*G01M 3/24* (2006.01)

(52) U.S. Cl.
CPC .................................. *G01M 3/243* (2013.01)

(58) Field of Classification Search
CPC ......... G01M 3/243; G01M 3/38; Y02D 30/70
See application file for complete search history.

(56) References Cited

U.S. PATENT DOCUMENTS

| | | | | | |
|---|---|---|---|---|---|
| 5,138,567 | A * | 8/1992 | Mehrgardt | H03H 17/0263 | 708/304 |
| 5,144,568 | A * | 9/1992 | Glover | H03H 17/0263 | 708/304 |
| 2003/0033336 | A1 * | 2/2003 | Gremmert | H03H 17/0263 | 708/304 |
| 2003/0200242 | A1 * | 10/2003 | Jensen | A61N 1/025 | 708/304 |

FOREIGN PATENT DOCUMENTS

| | | | |
|---|---|---|---|
| CN | 102997062 | A | 3/2013 |
| KR | 1019990053479 | A | 6/2001 |

* cited by examiner

*Primary Examiner* — Kyle R Quigley
(74) *Attorney, Agent, or Firm* — Ming Jiang; OPENPTO US LLC

(57) ABSTRACT

A pipeline leakage monitoring method and system based on optical fiber sensing are provided, and belongs to the technical field of pipeline leakage monitoring. The disclosure eliminates the jump and drift of the signal baseline by quickly finding the median by dichotomy, and corrects the position of the integration starting point in real time to eliminate the cumulative effect, while retaining the low-frequency response of the sensor. The specific positions of the entry point and the exclusion point of the moving window in the sorted window data are quickly found by dichotomy, the execution speed of the method is greatly accelerated. By constructing the mapping relationship between original data and leakage parameter, a large number of redundant and invalid original data are simplified into leakage parameters equal to the number of segmented vibration data after preprocessing.

7 Claims, 5 Drawing Sheets

PIPELINE LEAKAGE MONITORING METHOD AND SYSTEM BASED ON OPTICAL FIBER SENSING

CROSS-REFERENCE TO RELATED APPLICATIONS

This application claims priority of Chinese Patent Application No. 202411283416.9, filed on Sep. 13, 2024, the content of which is hereby incorporated by reference.

TECHNICAL FIELD

The disclosure relates to the technical field of signal processing, in particular to a pipeline leakage monitoring method and system based on optical fiber sensing.

BACKGROUND

With the continuous development and progress of society, the supply and transportation of energy, such as water resources, oil, gas, etc., are increasing day by day, and most of the energy needs to be preserved and transmitted by relying on pipelines of various materials. In recent years, pipeline leakage has caused waste of resources and even frequent safety accidents, which has brought huge losses and adverse effects to society. In the prior art, the technologies for pipeline leakage monitoring mainly include direct detection method, indirect detection method, negative pressure wave method, infrasound wave method and optical fiber leak detection method, in which the optical fiber leak detection method mainly converts vibration signals into phase changes of optical based on a balanced interferometer, and then converts the optical signals into electrical signals through a photoelectric detector, and the hardware demodulates the vibration signals and then transmits the data to a cloud server for leak identification and judgment. Compared with other technical methods, the optical fiber leak detection method has the advantages of high sensitivity, strong anti-interference and low layout cost, and has been widely used. However, at present, there are still shortcomings and defects in the optical fiber leak detection method, such as the lack of effective and reasonable preprocessing process for vibration data picked up by sensors, which leads to data redundancy and consumes a lot of battery power.

In practical application, due to the interference of external large vibration and the influence of integrator in demodulation, the signal baseline of DCM demodulation output signal $\theta_s$ will inevitably jump and drift at low frequency, and its drift will become larger and larger with the passage of time, with a cumulative effect, which will eventually lead to data overflow, that is, the starting point of integration cannot be obtained, resulting in demodulation failure. In the prior art, a high-order filter is used for filtering, and the high-order filter means a huge amount of calculation. In the miniaturized and low-power products, the low-performance SOCs cannot support real-time big data processing, and nor can they eliminate the cumulative effect of the integration starting point.

In addition, in the prior art, the data filtered by the low-pass filter is usually directly uploaded to the cloud platform for calculation of pipeline leakage judgment. However, due to the large amount of original data, it will cause a certain transmission pressure to the low-power wireless transmission module, and at the same time consume a lot of battery power of the equipment, resulting in too much invalid data stored in the cloud platform.

Aiming at the above technical problems, the disclosure provides a pipeline leakage monitoring method and system based on optical fiber sensing, which eliminates the jump and drift of the signal baseline by quickly finding the median by dichotomy, and corrects the position of the integration starting point in real time to eliminate the cumulative effect, while well retaining the low-frequency response of the sensor. The specific positions of the entry point and the exclusion point of the moving window in the sorted window data are quickly found by dichotomy, so that multiple sorting is not needed, the program execution steps are simplified, and the execution speed of the method and the corresponding program is greatly accelerated. By constructing the mapping relationship between original data and leakage parameter, a large number of redundant and invalid original data are simplified into leakage parameters equal to the number of segmented vibration data after preprocessing, that is, the whole segment uploaded original data N is divided into N/10 segments and converted into N/10 leakage data for uploading, which greatly decreases and reduces the transmission amount of original data, reduces the power consumption of sensors itself, reduces the storage of invalid and redundant data by cloud platform, and relieves the transmission pressure of low-power wireless transmission modules.

SUMMARY

Aiming at the above problems, a pipeline leakage monitoring method and system based on optical fiber sensing are provided. The disclosure eliminates the jump and drift of the signal baseline by quickly finding the median by dichotomy, and corrects the position of the integration starting point in real time to eliminate the cumulative effect, while well retaining the low-frequency response of the sensor. The specific positions of the entry point and the exclusion point of the moving window in the sorted window data are quickly found by dichotomy, so that multiple sorting is not needed, the program execution steps are simplified, and the execution speed of the method and the corresponding program is greatly accelerated. By constructing the mapping relationship between original data and leakage parameter, a large number of redundant and invalid original data are simplified into leakage parameters equal to the number of segmented vibration data after preprocessing, which greatly decreases and reduces the transmission amount of original data, reduces the power consumption of sensors itself, reduces the storage of invalid and redundant data by cloud platform, and relieves the transmission pressure of low-power wireless transmission modules.

In order to achieve the above purpose, the technical scheme adopted by the disclosure is as follows.

A de-biasing method for a demodulated signal is provided and includes:

- S1: setting a sampling rate of ADC module, and setting two buffer areas, buffer1 and buffer2, in SOC module; where buffer area buffer1 is capable of storing 2640 data points, buffer area buffer2 is capable of storing 2401 data points, and DCM module continuously caches 10 frames data in buffer area buffer1;
- S2: arranging the 10 frames data in buffer area buffer1 in S2 according to numerical order of data points from small to large, and then copying to buffer area buffer2, and sequentially caching next frame entering data to last frame of buffer area buffer1 in order;
- S3: setting a time window with 2401 data points in buffer area buffer1, and moving backward data points one by one according to time sequence, so as to find out point in data points entering time window and point out data points being excluded during moving process, where a frame data at a back end of buffer area buffer1 needs to be moved 240 times;

S4: quickly finding positions corresponding to point in data points and point out data points in S4 in sorted buffer area buffer2 by using dichotomy, and after excluding the point out data points, moving all data in a middle of corresponding positions of the point in data points and the point out data points to a point out data point position direction by a data point position; then inputting point in data points into a sequence of buffer area buffer2, so as to ensure arrangement order of all data point values in buffer area buffer2 being not disturbed; now, a point in a middle position of a sequence of buffer area buffer2 is a median point;

S5: sequentially subtracting all data points in a 6th frame data in a middle of buffer area buffer1 from the median point in S5, where an output frame data is de-biased data;

S6: after a frame data cycle processing is completed, deleting a first frame data in buffer area buffer1, and simultaneously moving last 10 frames data forward by one frame position, and vacanting a position of 11th frame data to wait for a next frame data to enter;

S7: subtracting a median point after a last data point of previous frame data being processed from all data points in the two buffer areas buffer1 and buffer2, and saving a value of a last data point of 10th frame data in buffer area buffer1 as an integration starting point of a next frame data, and executing circularly according to above steps to output de-biased data of each frame in real time.

Preferably, the sampling rate of the ADC module is set to 24 Ksps, and every 240 data points are collected as a frame data point and as a frame.

A data preprocessing method is provided, and includes:

S1: intercepting a segment original data with a 10 s duration from original data output by a low-pass filter as vibration data to be frame processed, and storing in Flash memory of a sensor;

S2: performing frame processing on the vibration data in S1 to calculate frame number of the vibration data;

$$FrameNum = (TotalLen - FrameLen + FrameInc)/FrameInc;$$

where, TotalLen represents a length of the vibration data; FrameLen represents a frame length; FrameInc is frame shift, indicating a moving distance between a previous frame data and a next frame data after framing processing;

S3: calculating root mean square Arms of each frame data in the vibration data, simultaneously retrieving root mean square of bottom noise data stored in the Flash memory, and calculating a signal-to-noise ratio parameter of each frame data in the vibration data;

$$SNR = 20 * \ln(Frame\text{RMS}/Base\text{RMS});$$

where, FrameRMS represents the root mean square of each frame data in the vibration data; BaseRMS represents the root mean square of the bottom noise data stored in the Flash memory inside the sensor;

S4: performing rounding operation of selecting integer on the signal-to-noise ratio parameter of each frame data in the vibration data, and selecting a signal-to-noise ratio parameter with a largest number of equal values after selecting integer, that is, mode is used as a leakage parameter of whole vibration data;

S5: returning to S1, intercepting and calculating a leakage parameter of a next segment 10 s duration vibration data until a mapping relationship database between each segment vibration data and corresponding a leakage parameter in whole original data is constructed, and simultaneously outputting leakage parameters corresponding to the whole original data to a communication module, thus completing preprocessing of the whole original data.

Preferably, in S2, the frame length FrameLen is selected as 55 ms, and the frame shift FrameInc is selected as 51 ms, that is, an overlapping area of the previous frame data and the next frame data is 4 ms.

Preferably, a calculation formula of the root mean square $A_{rms}$ in S3 is:

$$A_{rms} = \sqrt{\frac{\sum_{i=1}^{N} A_i^2}{N}};$$

where $A_i$ represents a value of a single data point and N is a length of the vibration data.

A pipeline leakage monitoring method based on optical fiber sensing is provided and includes:

S1: outputting two optical signals with fixed phase difference by an interferometer, converting into two electrical signals with fixed phase difference by photodetector I and photodetector II respectively, and then outputting to ADC module; where the two electrical signals are expressed as:

$$V_1 = a_1 + b_1\cos(\theta_s);$$

$$V_2 = a_2 + b_2\cos(\theta_s - \beta);$$

where $a_1$ and $a_2$ represent direct current bias of two signals; $b_1$ and $b_2$ are alternating current amplitudes; $\theta_s$ is phase to be measured, indicating phase change caused by external vibration; $\beta$ is a fixed phase difference.

S2: synchronously collecting two electrical signals by the ADC module, then outputting to an ellipse fitting module, and outputting parameters $a_1$, $a_2$, $b_1$, $b_2$ and $\beta$ in S1 after demodulation by the ellipse fitting module, and constructing two orthogonal signals containing phase $\theta_s$ to be measured and outputting to a DCM module, where the two orthogonal signals are expressed as:

$$V1' = \cos\theta_s = (V_1 - a_1)/b_1;$$

$$V2' = \sin\theta_s = [V_2 - a_2 - b_2\cos\theta_s\cos\beta]/b_2\sin\beta;$$

S3: after the two orthogonal signals are demodulated by the DCM module, outputting phase $\theta_s$ to be measured to a de-biasing module, and outputting de-biased data to a low-pass filter for real-time filtering calculation by the de-biasing module according to the de-biasing method for a demodulated signal, and outputting filtered original data to a data preprocessing module;

performing preprocessing on original data by the data preprocessing module according to the data preprocessing method, outputting a leakage parameter corresponding to the original data to a communication module, and uploading the leakage parameter to a cloud platform by the communication module;

S5: judging whether there is a pipeline leakage signal according to the leakage parameter in S4 by the cloud platform, where if the leakage parameter exceeds set thresholds, there is the pipeline leakage signal is judged, and now, vibration data corresponding to leakage parameter are copied by the cloud platform is as a vibration spectrum output by the cloud platform, and a pipeline leakage alarm signal is output.

A pipeline leakage monitoring system is provided and includes a sensor, where the sensor includes an interferometer, a SOC module and a communication module; the SOC module includes an ADC module, an ellipse fitting module, a DCM module, a de-biasing module, a low-pass filter and a data preprocessing module; when the interferometer picks up a pipeline leakage signal, two electrical signals with fixed phase difference are output to the ADC module in the SOC module, the ADC module outputs the two electrical signals to the ellipse fitting module after synchronous collection, and two orthogonal signals are output to the DCM module after demodulation by the ellipse fitting module.

Preferably, the two orthogonal signals are demodulated by the DCM module and then output phase $\theta_s$ to be measured to the de-biasing module, and the de-biasing module outputs de-biased data to the low-pass filter for real-time filtering calculation according to the de-biasing method for a demodulated signal, and outputs filtered original data to the data preprocessing module; the data preprocessing module performs preprocessing on original data according to the data preprocessing method, and outputs a leakage parameter corresponding to the original data to the communication module, and the communication module uploads the leakage parameter to a cloud platform; then the cloud platform judges whether there is a pipeline leakage signal according to the leakage parameter, and if the leakage parameter exceeds a set threshold, there is the pipeline leakage signal is judged, now the cloud platform copies vibration data corresponding to the leakage parameter as a vibration spectrum output by the cloud platform, and outputs a pipeline leakage alarm signal.

Preferably, the interferometer includes a laser, an elastomer, a mass block, a reference optical fiber, a sensing optical fiber, a Faraday rotating mirror, a 3×3 coupler, a photodetector I and a photodetector II.

Preferably, a third output end of the 3×3 coupler is performed to elimination return processing.

Preferably, the sensing optical fiber is uniformly wound on a surface of the elastomer; the reference optical fiber is uniformly wound on a surface of a cylindrical groove of the mass block.

Preferably, laser output by the laser is split into sensing optical and reference optical after passing through the 3×3 coupler; a tiny vibration signal generated when a pipeline leaks is transmitted to the elastomer at a lower end of the interferometer through the pipeline, so as to drive the elastomer to generate vibration with a same frequency and equal amplitude, and then cause the sensing optical fiber wound on the elastomer to generate telescopic vibration change; the mass block is insensitive to external vibration signals, fails to generate vibration with a same frequency and equal amplitude, and fails to generate telescopic vibration change corresponding to the reference optical fiber wound on a surface of a cylindrical groove of the mass block; now, an optical path difference between the sensing optical fiber and the reference optical fiber changes; the sensing optical and the reference optical return to the 3×3 coupler along an original path after being reflected by the Faraday rotating mirror, and two optical signals with fixed phase difference are generated in the 3×3 coupler, and the two optical signals are converted into two optical signals with fixed phase difference by the photodetector I and the photodetector II respectively and output to the ADC module in the SOC module.

Due to the adoption of the technical scheme, the disclosure has the following beneficial effects.

Firstly, the disclosure eliminates the jump and drift of the signal baseline by quickly finding the median by dichotomy, and corrects the position of the integration starting point in real time to eliminate the cumulative effect, at the same time, the low-frequency response of the sensor is well reserved, the jump and drift phenomenon of the signal baseline are solved, and the risks of data overflow and demodulation failure are avoided.

Secondly, the disclosure quickly finds the specific positions of the entry point and the exclusion point of the moving window in the sorted window data by dichotomy, without sorting for many times, thus simplifying the program execution steps and greatly accelerating the execution speed of the method and the corresponding program. So as to reduce the calculation amount in signal processing and improve the response speed of the system. Compared with the traditional high-order filter scheme, the problem that real-time big data operation cannot be supported on miniaturized low-power devices is solved.

Thirdly, in the disclosure, by constructing the mapping relationship between original data and leakage parameter, a large number of redundant and invalid original data are simplified into leakage parameters equal to the number of segmented vibration data after preprocessing, that is, the whole segment uploaded original data N is divided into N/10 segments and converted into N/10 leakage data for uploading, which greatly decreases and reduces the transmission amount of original data, reduces the power consumption of sensors itself, reduces the storage of invalid and redundant data by cloud platform, and relieves the transmission pressure of low-power wireless transmission modules.

Fourthly, the disclosure demodulates the micro-vibration signal generated by external pipeline leakage through a balanced Michelson interferometer composed of a 3×3 coupler and a Faraday rotating mirror, and combines an ellipse fitting algorithm and differential cross multiplication (DCM) to achieve the technical effect of accurately and stably measuring the vibration signal. Compared with the traditional optical fiber leakage detection technical scheme, the disclosure solves the problems of data redundancy and power consumption caused by the lack of effective preprocessing of vibration data by sensors.

Fifthly, the disclosure uploads the processed leakage parameters to the cloud platform by adopting a data preprocessing method, so as to achieve the technical effects of reducing the transmission pressure of the wireless transmission module, reducing the battery power consumption of equipment and reducing the invalid data stored in the platform. Compared with the traditional scheme of directly transmitting the original data, the disclosure solves the problem of low transmission and storage efficiency caused by a large amount of original data.

BRIEF DESCRIPTION OF THE DRAWINGS

The fabrication and application of the preferred embodiment of the disclosure will be discussed in detail below. However, it should be understood that the disclosure provides many applicable concepts, which can be embodied in various specific environments. The specific embodiments discussed are only for explaining the specific ways of manufacturing and using the disclosure, and do not limit the scope of the disclosure. For those ordinary skilled in the art, other drawings can be obtained according to these drawings without creative work.

Figure 1:
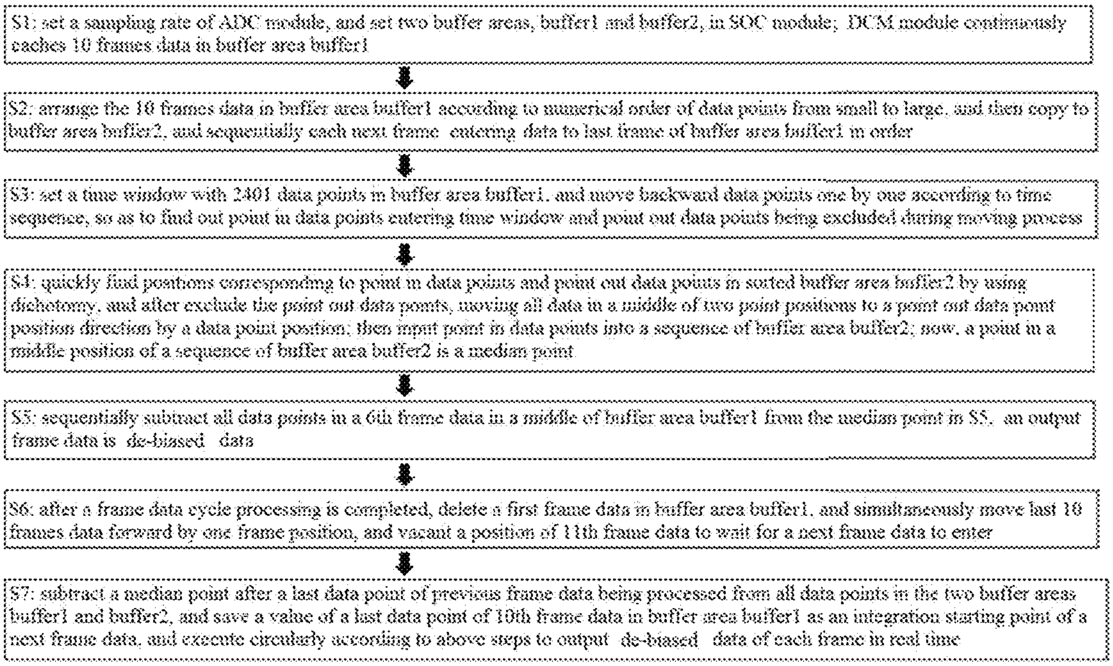
FIG. 1 is a flowchart of a de-biasing method according to the disclosure.

List of reference characters: 1 mass block; 2 elastomer; 3 Faraday rotating mirror; 4 reference optical fiber; 5 elimination return processing; 6 sensing optical fiber; 7 3×3 coupler; 8 photodetector I; 9 laser; 10 photodetector II; 11 SOC module; 12 ADC module; 13 ellipse fitting module; 14 DCM module; 15 de-biasing module; 16 low-pass filter; 17 data preprocessing module; and 18 communication module.

DETAILED DESCRIPTION OF THE EMBODIMENTS

In the following, the fabrication and application of the preferred embodiment of the disclosure will be discussed in detail. However, it should be understood that the disclosure provides many applicable concepts, which can be embodied in various specific environments. The specific embodiments discussed are only for illustrating the specific ways of fabricating and using the disclosure, and do not limit the scope of the disclosure.

The disclosure eliminates the jump and drift of the signal baseline by quickly finding the median by dichotomy, and corrects the position of the integration starting point in real time to eliminate the cumulative effect, at the same time, the low-frequency response of the sensor is well reserved, the jump and drift phenomenon of the signal baseline are solved, and the risks of data overflow and demodulation failure are avoided. Further, the disclosure quickly finds the specific positions of the entry point and the exclusion point of the moving window in the sorted window data by dichotomy, without sorting for many times, thus simplifying the program execution steps and greatly accelerating the execution speed of the method and the corresponding program. So as to reduce the calculation amount in signal processing and improve the response speed of the system. Compared with the traditional high-order filter scheme, the problem that real-time big data operation cannot be supported on miniaturized low-power devices is solved.

The following will be further described with reference to FIGS. 1-3, and FIGS. 4A-4B.

Embodiment 1

A de-biasing method for a demodulated signal as shown in FIG. 1 includes the following steps.

Step 1: the sampling rate of ADC module 12 is set to 24 Ksps, and every 240 data points are collected as one frame data; the data collected by ADC module 12 are demodulated by ellipse fitting module 13 and DCM module 14 in turn and then output to de-biasing module 15.

Step 2: two buffer areas, buffer1 and buffer2, in the SOC module 11 are set. The buffer area buffer1 can store 2640 data points, buffer area buffer2 can store 2401 data points, and DCM module 14 continuously caches 10 frames data in buffer area buffer1.

Step 3: the 10 frames data in buffer area buffer1 of step 2 is copied into buffer area buffer2 according to the numerical order of data points from small to large, and the next frame entering data sequentially is cached to the last frame of buffer area buffer1 in order, that is, there are 11 frames data in buffer area buffer1.

Step 4: a time window with 2401 data points is set in buffer area buffer1, and data points are moved backward one by one according to the time sequence to find out the point in data points that entered the time window and the point out data points being excluded during the movement. A frame data at a back end of buffer area buffer1 needs to be moved 240 times.

Step 5: positions corresponding to point in data points and point out data points in step 4 are quickly found in sorted buffer area buffer2 by using dichotomy, and after excluding the point out data points, all data in a middle of corresponding positions of the point in data points and the point out data points is moved to a point out data point position direction by a data point position; then point in data points are input into a sequence of buffer area buffer2, so as to ensure arrangement order of all data point values in buffer area buffer2 being not disturbed; now, a point in a middle position of a sequence of buffer area buffer2 is a median point.

Figure 4A:
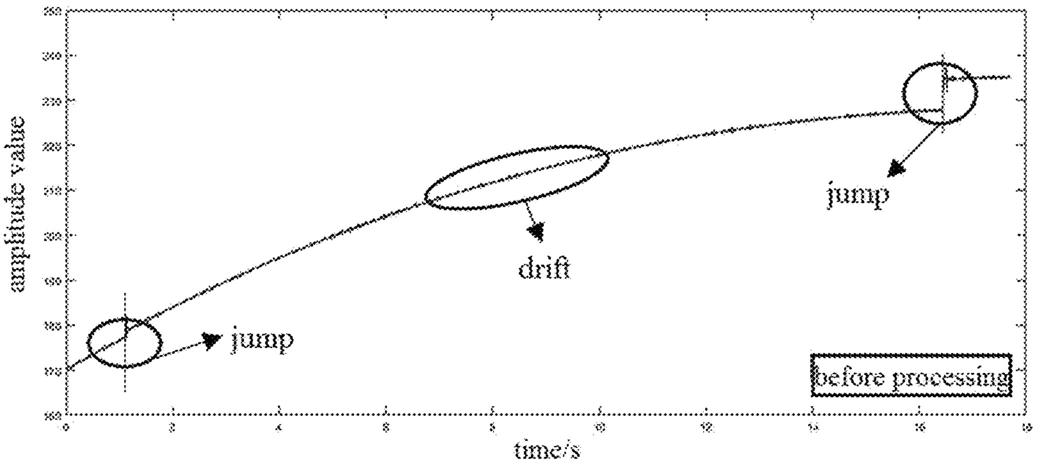
FIG. 4A is a time domain diagram of the phase to be measured output by the DCM module after demodulation by using the monitoring method of the disclosure.

The jump of the signal baseline is eliminated by quickly finding the median by dichotomy in step 5. After de-biasing processing, the time domain waveform of the jump elimination of the signal baseline is shown in FIG. 4A, and the low frequency response of the sensor is well preserved, which solves the jump phenomenon of the signal baseline and avoids the risk of data overflow and demodulation failure. In addition, the specific positions of the entry point and the exclusion point of the moving window in the sorted window data are quickly found by dichotomy, without sorting for many times, thus simplifying the program execution steps and greatly accelerating the execution speed of the method and the corresponding program. So as to reduce the calculation amount in signal processing and improve the response speed of the system. Compared with the traditional high-order filter scheme, the problem that real-time big data operation cannot be supported on miniaturized low-power devices is solved.

Step 6: all data points in a 6th frame data in a middle of buffer area buffer1 sequentially are subtracted from the median point in S5, where an output frame data is de-biased data.

The drift of the signal baseline is eliminated by quickly finding the median by dichotomy in step 5. After de-biasing processing, the time domain waveform of the drift elimination of the signal baseline is shown in FIG. 4A. The drift phenomenon of signal baseline is solved and the risk of data overflow and demodulation failure is avoided.

Step 7: after a frame data cycle processing is completed, a first frame data is deleted in buffer area bufferl, and simultaneously last 10 frames data is moved forward by one frame position, and a position of 11th frame data is vacanted to wait for a next frame data to enter.

Step 8: a median point after a last data point of previous frame data being processed is subtracted from all data points in the two buffer areas bufferl and buffer2, and a value of a last data point of 10th frame data in buffer area bufferl is saved as an integration starting point of a next frame data.

Figure 4B:
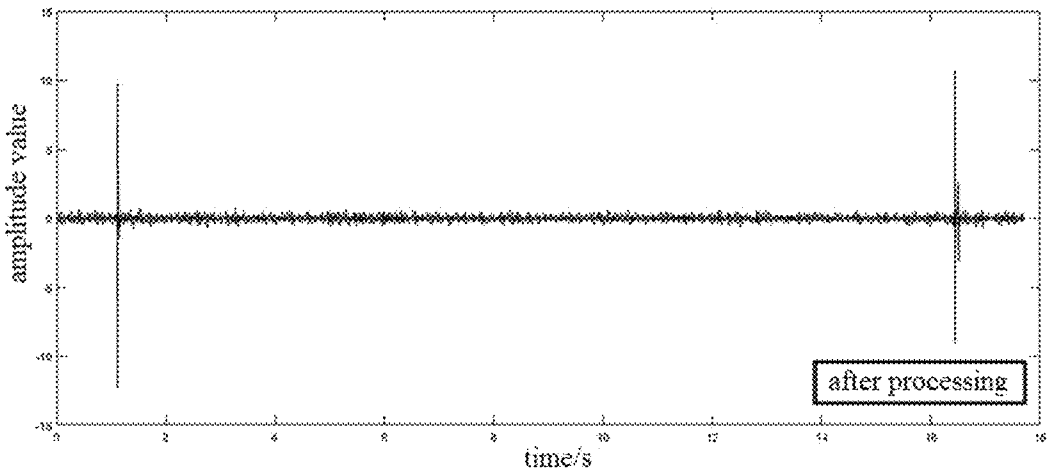
FIG. 4B is an effect diagram after eliminating the jump and drift of the signal baseline by using the monitoring method of the disclosure.

In step 8, the value of the last data point of the 10th frame data in buffer area bufferl is saved as the integration starting point of the next frame data, and the position of the integration starting point is corrected in real time to eliminate the accumulation effect. After de-biasing processing, the time domain waveform of eliminating cumulative benefits is shown in FIG. 4B.

Step 9: the steps are circularly executed according to the above steps, and the de-biased data of each frame is output to the low-pass filter 16 in real time to complete the de-biasing processing of the data demodulated by the DCM module 14.

Embodiment 2

Figure 2:
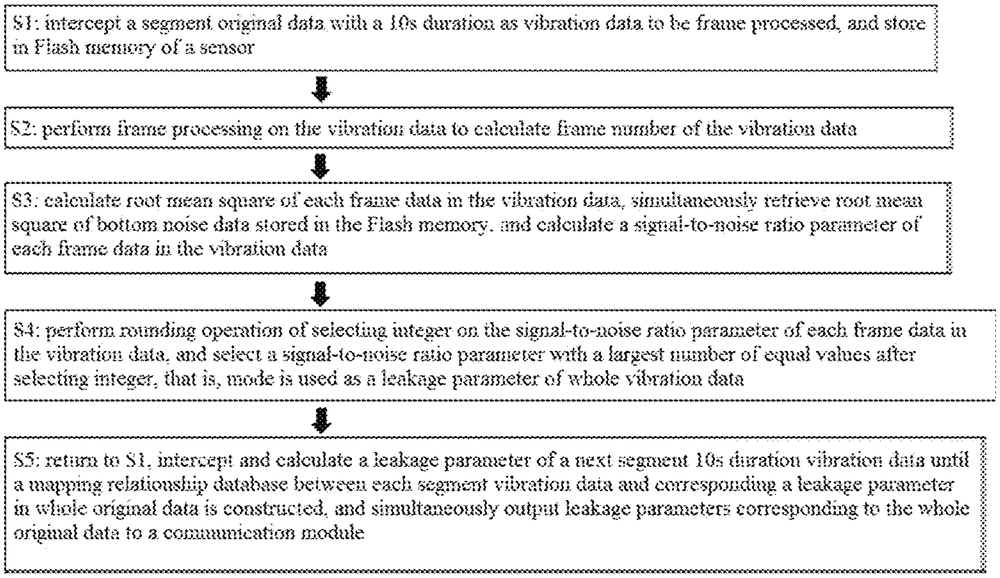
FIG. 2 is a flowchart of the data preprocessing method according to the disclosure.

A data preprocessing method as shown in FIG. 2 includes the following steps: step 1: a segment original data with a 10 s duration is intercepted from original data output by a low-pass filter as vibration data to be frame processed, and is stored in Flash memory of a sensor.

Step 2: frame processing is performed on the vibration data in S1 to calculate frame number of the vibration data:

$$FrameNum = (TotalLen - FrameLen + FrameInc)/FrameInc;$$

where, TotalLen represents a length of the vibration data; FrameLen represents a frame length; FrameInc is frame shift, indicating a moving distance between a previous frame data and a next frame data after framing processing. The frame length FrameLen is selected as 55 ms, and the frame shift FrameInc is selected as 51 ms, that is, an overlapping area of the previous frame data and the next frame data is 4 ms.

Step 3: root mean square $A_{rms}$ of each frame data in the vibration data is calculated, simultaneously root mean square of bottom noise data stored in the Flash memory is retrieved, and a signal-to-noise ratio parameter of each frame data in the vibration data is calculated:

$$SNR = 20 * \ln(FrameRMS/BaseRMS);$$

where, FrameRMS represents the root mean square of each frame data in the vibration data; BaseRMS represents the root mean square of the bottom noise data stored in the Flash memory inside the sensor.

A calculation formula of the root mean square $A_{rms}$ is:

$$A_{rms} = \sqrt{\frac{\sum_{i=1}^{N} A_i^2}{N}};$$

where $A_i$ represents a value of a single data point and N is a length of the vibration data.

Step 4: rounding operation of selecting integer is performed on the signal-to-noise ratio parameter of each frame data in the vibration data, and a signal-to-noise ratio parameter with a largest number of equal values after selecting integer is selected, that is, mode is used as a leakage parameter of whole vibration data.

Step 5: step 1 is returned, a leakage parameter of a next segment 10 s duration vibration data is intercepted and calculated until a mapping relationship database between each segment vibration data and corresponding a leakage parameter in whole original data is constructed, and simultaneously leakage parameters corresponding to the whole original data are output to a communication module 18, thus preprocessing of the whole original data is completed.

The data preprocessing method in this embodiment simplifies a large number of redundant and invalid original data into leakage parameters equal to the number of segmented vibration data after preprocessing, by constructing the mapping relationship between original data and leakage parameter, that is, the whole segment uploaded original data N is divided into N/10 segments and converted into N/10 leakage data for uploading, which greatly decreases and reduces the transmission amount of original data, reduces the power consumption of sensors itself, reduces the storage of invalid and redundant data by cloud platform, and relieves the transmission pressure of low-power wireless transmission modules.

In addition, the data preprocessing method in this embodiment uploads uploads the processed leakage parameters to the cloud platform by adopting a data preprocessing method, so as to achieve the technical effects of reducing the transmission pressure of the wireless transmission module, reducing the battery power consumption of equipment and reducing the invalid data stored in the platform. Compared with the traditional scheme of directly transmitting the original data, the disclosure solves the problem of low transmission and storage efficiency caused by a large amount of original data.

Embodiment 3

A pipeline leakage monitoring method based on optical fiber sensing is provided and includes the following steps: step 1: an interferometer outputs two optical signals with fixed phase difference, photodetector I 8 and photodetector II 10 converts them into two electrical signals with fixed phase difference respectively, and then they are output to ADC module 12; where the two electrical signals are expressed as:

$$V_1 = a_1 + b_1\cos(\theta_s);$$

$$V_2 = a_2 + b_2\cos(\theta_s - \beta);$$

where $a_1$ and $a_2$ represent direct current bias of two signals; $b_1$ and $b_2$ are alternating current amplitudes; $\theta_s$ is phase to be measured, indicating phase change caused by external vibration; $\beta$ is a fixed phase difference.

Step 2: two electrical signals are synchronously collected by the ADC module 12, then output to an ellipse fitting module 13, and parameters $a_1$, $a_2$, $b_1$, $b_2$ and $\beta$ in S1 are output after demodulation by the ellipse fitting module 13, and two orthogonal signals containing phase $\theta_s$ to be measured are constructed and output to a DCM module 14, where the two orthogonal signals are expressed as:

$$V1' = \cos\theta_s = (V_1 - a_1)/b_1;$$

$$V2' = \sin\theta_s = [V_2 - a_2 - b_2\cos\theta_s\cos\beta]/b_2\sin\beta;$$

Step 3: after the two orthogonal signals are demodulated by the DCM module 14, phase $\theta_s$ to be measured is output to a de-biasing module 15, and de-biased data is output to a low-pass filter 16 for real-time filtering calculation by the de-biasing module 15 according to the de-biasing method for a demodulated signal, and filtered original data is output to a data preprocessing module 17.

Step 4: preprocessing is performed on original data by the data preprocessing module 17 according to the data preprocessing method, a leakage parameter corresponding to the original data is output to a communication module 18, and the leakage parameter is uploaded to a cloud platform by the communication module 18.

Step 5: whether there is a pipeline leakage signal is judged according to the leakage parameter in S4 by the cloud platform, where if the leakage parameter exceeds set thresholds, there is the pipeline leakage signal is judged, and now, vibration data corresponding to leakage parameter are copied by the cloud platform is as a vibration spectrum output by the cloud platform, and a pipeline leakage alarm signal is output.

Embodiment 4

Figure 3:
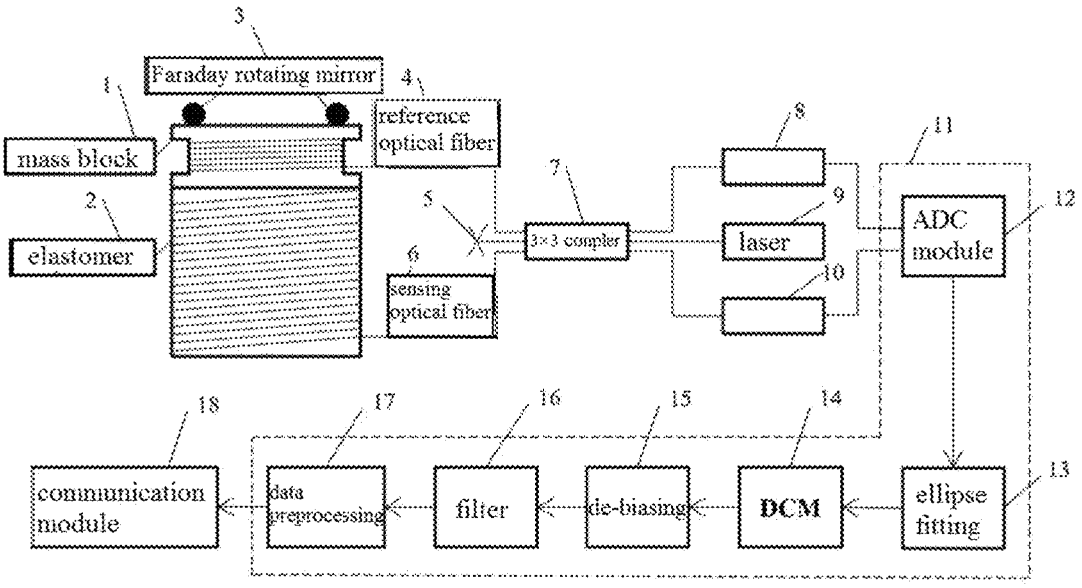
FIG. 3 is a schematic structural diagram according to the disclosure.

As shown in FIG. 3, a pipeline leakage monitoring system includes a sensor, where the sensor includes an interferometer, a SOC module 11 and a communication module 18. The SOC module 11 includes an ADC module 12, an ellipse fitting module 13, a DCM module 14, a de-biasing module 15, a low-pass filter 16 and a data preprocessing module 17. When the interferometer picks up a pipeline leakage signal, two electrical signals with fixed phase difference are output to the ADC module 12 in the SOC module 11, the ADC module 12 outputs the two electrical signals to the ellipse fitting module 13 after synchronous collection, and two orthogonal signals are output to the DCM module 14 after demodulation by the ellipse fitting module 13.

The two orthogonal signals are demodulated by the DCM module 14 and then output phase $\theta_s$ to be measured to the de-biasing module 15, and the de-biasing module 15 outputs de-biased data to the low-pass filter 16 for real-time filtering calculation according to the de-biasing method for a demodulated signal, and outputs filtered original data to the data preprocessing module 17; the data preprocessing module 17 performs preprocessing on original data according to the data preprocessing method, and outputs a leakage parameter corresponding to the original data to the communication module 18, and the communication module 18 uploads the leakage parameter to a cloud platform; then the cloud platform judges whether there is a pipeline leakage signal according to the leakage parameter, and if the leakage parameter exceeds a set threshold, there is the pipeline leakage signal is judged, now the cloud platform copies vibration data corresponding to the leakage parameter as a vibration spectrum output by the cloud platform, and outputs a pipeline leakage alarm signal.

The interferometer includes a laser 9, an elastomer 2, a mass block 1, a reference optical fiber 4, a sensing optical fiber 6, a Faraday rotating mirror 3, a 3×3 coupler 7, a photodetector I 8 and a photodetector II 10. A third output end of the 3×3 coupler is performed to elimination return processing 4. The sensing optical fiber 6 is uniformly wound on a surface of the elastomer 2; the reference optical fiber 4 is uniformly wound on a surface of a cylindrical groove of the mass block 1.

The principle that the interferometer picks up tiny vibration signals leaked by external pipelines is as follows: laser output by the laser 9 is split into sensing optical and reference optical after passing through the 3×3 coupler 7; a tiny vibration signal generated when a pipeline leaks is transmitted to the elastomer 2 at a lower end of the interferometer through the pipeline, so as to drive the elastomer 2 to generate vibration with a same frequency and equal amplitude, and then cause the sensing optical fiber 6 wound on the elastomer 2 to generate telescopic vibration change; the mass block 1 is insensitive to external vibration signals, fails to generate vibration with a same frequency and equal amplitude, and fails to generate telescopic vibration change corresponding to the reference optical fiber 4 wound on a surface of a cylindrical groove of the mass block 1. Now, an optical path difference between the sensing optical fiber 6 and the reference optical fiber 4 changes; the sensing optical and the reference optical return to the 3×3 coupler 7 along an original path after being reflected by the Faraday rotating mirror 3, and two optical signals with fixed phase difference are generated in the 3×3 coupler 7, and the two optical signals are converted into two optical signals with fixed phase difference by the photodetector I 8 and the photodetector II 10 respectively and output to the ADC module 12 in the SOC module 11. The two electrical signals are expressed as:

$$V_1 = a_1 + b_1\cos(\theta_s);$$

$$V_2 = a_2 + b_2\cos(\theta_s - \beta);$$

where $a_1$ and $a_2$ represent direct current bias of two signals; $b_1$ and $b_2$ are alternating current amplitudes; $\theta_s$ is phase to be measured, indicating phase change caused by external vibration; $\beta$ is a fixed phase difference.

Two electrical signals are synchronously collected by the ADC module 12, then output to an ellipse fitting module, and parameters $a_1$, $a_2$, $b_1$, $b_2$ and $\beta$ in S1 are output after demodulation by the ellipse fitting module 13, and two orthogonal signals containing phase $\theta_s$ to be measured are constructed and output to a DCM module 14, where the two orthogonal signals are expressed as:

$$V1' = \cos\theta_s = (V_1 - a_1)/b_1;$$

$$V2' = \sin\theta_s = [V_2 - a_2 - b_2\cos\theta_s\cos\beta]/b_2\sin\beta;$$

After the two orthogonal signals are demodulated by the DCM module 14, phase $\theta_s$ to be measured is output to a de-biasing module 15, and de-biased data is output to a low-pass filter 16 for real-time filtering calculation by the de-biasing module 15 according to the de-biasing method for a demodulated signal, and filtered original data is output to a data preprocessing module 17. The preprocessing is performed on original data by the data preprocessing module 17 according to the data preprocessing method, a leakage parameter corresponding to the original data is output to a communication module 18, and the leakage parameter is uploaded to a cloud platform by the communication module 18. Whether there is a pipeline leakage signal is judged according to the leakage parameter in S4 by the cloud platform, where if the leakage parameter exceeds set thresholds, there is the pipeline leakage signal is judged, and now, vibration data corresponding to leakage parameter are copied by the cloud platform is as a vibration spectrum output by the cloud platform, and a pipeline leakage alarm signal is output.

The disclosure demodulates the micro-vibration signal generated by external pipeline leakage through a balanced Michelson interferometer composed of a 3×3 coupler and a Faraday rotating mirror, and combines an ellipse fitting algorithm and differential cross multiplication (DCM) to achieve the technical effect of accurately and stably measuring the vibration signal. Compared with the traditional optical fiber leakage detection technical scheme, the disclosure solves the problems of data redundancy and power consumption caused by the lack of effective preprocessing of vibration data by sensors.

Although the description has been described in detail, it should be understood that various changes, substitutions and alterations can be made without departing from the spirit and scope of the disclosure as defined by the appended claims. In addition, the specific embodiments described are not used to limit the scope of the disclosure, and those ordinary skilled in the art can easily understand that the processes, machines, manufacturing, material compositions, means, methods, or steps currently existing or to be developed in the future can perform substantially the same functions or obtain substantially the same results as the embodiments of the disclosure. Therefore, the appended claims are intended to include such processes, machines, manufacture, material compositions, means, methods or steps within their scope.

What is claimed is:

1. A de-biasing method for a demodulated signal, comprising:

S1: setting a sampling rate of ADC module, and setting two buffer areas, buffer1 and buffer2, in SOC module; wherein buffer area buffer1 is capable of storing 2640 data points, buffer area buffer2 is capable of storing 2401 data points, and DCM module continuously caches 10 frames data in buffer area buffer1;

S2: arranging the 10 frames data in buffer area buffer1 in S2 according to numerical order of data points from small to large, and then copying to buffer area buffer2, and sequentially caching next frame entering data to last frame of buffer area buffer1 in order;

S3: setting a time window with 2401 data points in buffer area buffer1, and moving backward data points one by one according to time sequence, so as to find out point in data points entering time window and point out data points being excluded during moving process, wherein a frame data at a back end of buffer area buffer1 needs to be moved 240 times;

S4: quickly finding positions corresponding to point in data points and point out data points in S4 in sorted buffer area buffer2 by using dichotomy, and after excluding the point out data points, moving all data in a middle of corresponding positions of the point in data points and the point out data points to a point out data point position direction by a data point position; then inputting point in data points into a sequence of buffer area buffer2, so as to ensure arrangement order of all data point values in buffer area buffer2 being not disturbed; now, a point in a middle position of a sequence of buffer area buffer2 is a median point;

S5: sequentially subtracting all data points in a 6th frame data in a middle of buffer area buffer1 from the median point in S5, wherein an output frame data is de-biased data;

S6: after a frame data cycle processing is completed, deleting a first frame data in buffer area buffer1, and simultaneously moving last 10 frames data forward by one frame position, and vacanting a position of 11th frame data to wait for a next frame data to enter;

S7: subtracting a median point after a last data point of previous frame data being processed from all data points in the two buffer areas buffer1 and buffer2, and saving a value of a last data point of 10th frame data in buffer area buffer1 as an integration starting point of a next frame data, and executing circularly according to above steps to output de-biased data of each frame in real time.

2. The de-biasing method for a demodulated signal according to claim 1, wherein the sampling rate of the ADC module is set to 24 Ksps, and every 240 data points are collected as a frame data point and as a frame.

3. A pipeline leakage monitoring method based on optical fiber sensing, wherein the pipeline leakage monitoring method applies a de-biasing method for a demodulated signal and a data preprocessing method, wherein the de-biasing method for a demodulated signal comprises:

S1: setting a sampling rate of ADC module, and setting two buffer areas, buffer1 and buffer2, in SOC module; wherein buffer area buffer1 is capable of storing 2640 data points, buffer area buffer2 is capable of storing 2401 data points, and DCM module continuously caches 10 frames data in buffer area buffer1;

S2: arranging the 10 frames data in buffer area buffer1 in S2 according to numerical order of data points from small to large, and then copying to buffer area buffer2, and sequentially caching next frame entering data to last frame of buffer area buffer1 in order;

S3: setting a time window with 2401 data points in buffer area buffer1, and moving backward data points one by one according to time sequence, so as to find out point in data points entering time window and point out data points being excluded during moving process, wherein a frame data at a back end of buffer area buffer1 needs to be moved 240 times;

S4: quickly finding positions corresponding to point in data points and point out data points in S4 in sorted buffer area buffer2 by using dichotomy, and after excluding the point out data points, moving all data in a middle of corresponding positions of the point in data points and the point out data points to a point out data point position direction by a data point position; then inputting point in data points into a sequence of buffer area buffer2, so as to ensure arrangement order of all data point values in buffer area buffer2 being not disturbed; now, a point in a middle position of a sequence of buffer area buffer2 is a median point;

S5: sequentially subtracting all data points in a 6th frame data in a middle of buffer area buffer1 from the median point in S5, wherein an output frame data is de-biased data;

S6: after a frame data cycle processing is completed, deleting a first frame data in buffer area buffer1, and simultaneously moving last 10 frames data forward by one frame position, and vacanting a position of 11th frame data to wait for a next frame data to enter;

S7: subtracting a median point after a last data point of previous frame data being processed from all data points in the two buffer areas buffer1 and buffer2, and saving a value of a last data point of 10th frame data in buffer area buffer1 as an integration starting point of a next frame data, and executing circularly according to above steps to output de-biased data of each frame in real time;

wherein the data preprocessing method comprises:

S1: intercepting a segment original data with a 10 s duration from original data output by a low-pass filter as vibration data to be frame processed, and storing in Flash memory of a sensor;

S2: performing frame processing on the vibration data in S1 to calculate frame number of the vibration data;

$$FrameNum = (TotalLen - FrameLen + FrameInc)/FrameInc;$$

wherein, TotalLen represents a length of the vibration data; FrameLen represents a frame length; FrameInc is frame shift, indicating a moving distance between a previous frame data and a next frame data after framing processing;

S3: calculating root mean square Arms of each frame data in the vibration data, simultaneously retrieving root mean square of bottom noise data stored in the Flash memory, and calculating a signal-to-noise ratio parameter of each frame data in the vibration data;

$$SNR = 20 * \ln(FrameRMS/BaseRMS);$$

wherein, FrameRMS represents the root mean square of each frame data in the vibration data; BaseRMS represents the root mean square of the bottom noise data stored in the Flash memory inside the sensor;

S4: performing rounding operation of selecting integer on the signal-to-noise ratio parameter of each frame data in the vibration data, and selecting a signal-to-noise ratio parameter with a largest number of equal values after selecting integer, that is, mode is used as a leakage parameter of whole vibration data;

S5: returning to S1, intercepting and calculating a leakage parameter of a next segment 10 s duration vibration data until a mapping relationship database between each segment vibration data and corresponding a leakage parameter in whole original data is constructed, and simultaneously outputting leakage parameters corresponding to the whole original data to a communication module, thus completing preprocessing of the whole original data;

wherein the pipeline leakage monitoring method comprises:

S1: outputting two optical signals with fixed phase difference by an interferometer, converting into two electrical signals with fixed phase difference by photodetector I and photodetector II respectively, and then outputting to ADC module; wherein the two electrical signals are expressed as:

$$V_1 = a_1 + b_1\cos(\theta_s);$$

$$V_2 = a_2 + b_2\cos(\theta_s - \beta);$$

wherein $a_1$ and $a_2$ represent direct current bias of two signals; $b_1$ and $b_2$ are alternating current amplitudes; $\theta_s$ is phase to be measured, indicating phase change caused by external vibration; β is a fixed phase difference;

S2: synchronously collecting two electrical signals by the ADC module, then outputting to an ellipse fitting module, and outputting parameters $a_1$, $a_2$, $b_1$, $b_2$ and β in S1 after demodulation by the ellipse fitting module, and constructing two orthogonal signals containing phase $\theta_s$ to be measured and outputting to a DCM module, wherein the two orthogonal signals are expressed as:

$$V_1' = \cos\theta_s = (V_1 - a_1)/b_1;$$

$$V_2' = \sin\theta_s = [V_2 - a_2 - b_2\cos\theta_s\cos\beta]/b_2\sin\beta;$$

S3: after the two orthogonal signals are demodulated by the DCM module, outputting phase $\theta_s$ to be measured to a de-biasing module, and outputting de-biased data to a low-pass filter for real-time filtering calculation by the de-biasing module according to the de-biasing method for a demodulated signal, and outputting filtered original data to a data preprocessing module;

S4: performing preprocessing on original data by the data preprocessing module according to the data preprocessing method, outputting a leakage parameter corresponding to the original data to a communication module, and uploading the leakage parameter to a cloud platform by the communication module;

S5: judging whether there is a pipeline leakage signal according to the leakage parameter in S4 by the cloud platform, wherein if the leakage parameter exceeds set thresholds, there is the pipeline leakage signal is judged, and now, vibration data corresponding to leakage parameter are copied by the cloud platform is as a vibration spectrum output by the cloud platform, and a pipeline leakage alarm signal is output.

4. A pipeline leakage monitoring system of a pipeline leakage monitoring method according to claim 3, comprising a sensor, wherein the sensor comprises an interferometer, a SOC module and a communication module; the SOC module comprises an ADC module, an ellipse fitting module, a DCM module, a de-biasing module, a low-pass filter and a data preprocessing module; when the interferometer picks up a pipeline leakage signal, two electrical signals with fixed phase difference are output to the ADC module in the SOC module, the ADC module outputs the two electrical signals to the ellipse fitting module after synchronous collection, and two orthogonal signals are output to the DCM module after demodulation by the ellipse fitting module;

the two orthogonal signals are demodulated by the DCM module and then output phase θs to be measured to the de-biasing module, and the de-biasing module outputs de-biased data to the low-pass filter for real-time filtering calculation according to the de-biasing method for a demodulated signal, and outputs filtered original data to the data preprocessing module; the data preprocessing module performs preprocessing on original data according to the data preprocessing method, and outputs a leakage parameter corresponding to the original data to the communication module, and the communication module uploads the leakage parameter to a cloud platform; then the cloud platform judges whether there is a pipeline leakage signal according to the leakage parameter, and if the leakage parameter exceeds a set threshold, there is the pipeline leakage signal is judged, now the cloud platform copies vibration data corresponding to the leakage parameter as a vibration spectrum output by the cloud platform, and outputs a pipeline leakage alarm signal.

5. The pipeline leakage monitoring system based on optical fiber sensing according to claim 4, wherein the interferometer comprises a laser, an elastomer, a mass block, a reference optical fiber, a sensing optical fiber, a Faraday rotating mirror, a 3×3 coupler, a photodetector I and a photodetector II.

6. The pipeline leakage monitoring system according to claim 5, wherein a third output end of the 3×3 coupler is performed to elimination return processing; the sensing optical fiber is uniformly wound on a surface of the elastomer; the reference optical fiber is uniformly wound on a surface of a cylindrical groove of the mass block.

7. The pipeline leakage monitoring system according to claim 5, wherein laser output by the laser is split into sensing optical and reference optical after passing through the 3×3 coupler; a tiny vibration signal generated when a pipeline leaks is transmitted to the elastomer at a lower end of the interferometer through the pipeline, so as to drive the elastomer to generate vibration with a same frequency and equal amplitude, and then cause the sensing optical fiber wound on the elastomer to generate telescopic vibration change; the mass block is insensitive to external vibration signals, fails to generate vibration with a same frequency and equal amplitude, and fails to generate telescopic vibration change corresponding to the reference optical fiber wound on a surface of a cylindrical groove of the mass block; now, an optical path difference between the sensing optical fiber and the reference optical fiber changes; the sensing optical and the reference optical return to the 3×3 coupler along an original path after being reflected by the Faraday rotating mirror, and two optical signals with fixed phase difference are generated in the 3×3 coupler, and the two optical signals are converted into two optical signals with fixed phase difference by the photodetector I and the photodetector II respectively and output to the ADC module in the SOC module.

* * * * *